US009204293B2

(12) United States Patent
Imbimbo et al.

(10) Patent No.: US 9,204,293 B2
(45) Date of Patent: Dec. 1, 2015

(54) APPARATUSES, METHODS, AND COMPUTER PROGRAM PRODUCTS FOR DATA RETENTION AND LAWFUL INTERCEPT FOR LAW ENFORCEMENT AGENCIES

(75) Inventors: Amedeo Imbimbo, Caivano (IT); Francesco Attanasio, Nocera Superiore (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1114 days.

(21) Appl. No.: 12/918,611

(22) PCT Filed: Feb. 21, 2008

(86) PCT No.: PCT/EP2008/052143
§ 371 (c)(1),
(2), (4) Date: Oct. 7, 2010

(87) PCT Pub. No.: WO2009/103340
PCT Pub. Date: Aug. 27, 2009

(65) Prior Publication Data
US 2011/0029667 A1  Feb. 3, 2011

(51) Int. Cl.
*G06F 15/173* (2006.01)
*H04J 3/16* (2006.01)
(Continued)

(52) U.S. Cl.
CPC ............ *H04W 12/02* (2013.01); *H04L 43/026* (2013.01); *H04L 47/2441* (2013.01);
(Continued)

(58) Field of Classification Search
CPC ... H04L 43/026; H04L 47/2441; H04L 63/00; H04L 63/30; H04L 63/306; H04M 3/2281; H04M 7/006; H04W 12/02
USPC .............. 709/224, 238; 370/390, 469; 379/70
See application file for complete search history.

(56) References Cited

U.S. PATENT DOCUMENTS 2,152,032 A * 3/1939 Rice .......................... 105/224.06
5,101,402 A * 3/1992 Chiu et al. .................... 709/224
(Continued)

FOREIGN PATENT DOCUMENTS

| EP | 1389864 A1 * | 2/2004 | .............. H04M 3/22 |
| EP | 2152032 A1 * | 2/2010 | .............. H04L 29/06 |

(Continued)

OTHER PUBLICATIONS

"Lawful Interception (LI); Handover interface for the lawful interception of telecommunications traffic", ETSI TS 101 671, ETSI Standards, LIS, Sophia Antipolis, Cedex, France, vol. LI; Sec-LI, No. V3.2.1, Dec. 1, 2007, 124 pages, XP014040473.

(Continued)

*Primary Examiner* — Daniel C Murray
(74) *Attorney, Agent, or Firm* — Patent Portfolio Builders, PLLC (57) ABSTRACT

The method provides a Law Enforcement Agency LEA with retention or interception data related to a target user. At a data retention source node or at an interception control element of a telecommunications network, traffic packets involving the target user are inspected and a plurality of usage data records based on the inspected traffic packets are generated. Each record comprises information relating to a certain service class and to a respective communications stack layer. For each communications session involving a plurality of different communications stack layers, at the data retention source node or, respectively, the interception control element, the plurality of usage data records are provided with a same correlation identity number for correlating the data at the different communications stack layers. Then, the usage data records comprising the correlation identity number to the LEA are sent, for instance to the LI system or the data Retention System, respectively.

16 Claims, 9 Drawing Sheets (51) Int. Cl.
| | |
|---|---|
| *H04L 12/28* | (2006.01) |
| *H04M 1/64* | (2006.01) |
| *H04W 12/02* | (2009.01) |
| *H04M 7/00* | (2006.01) |
| *H04L 29/06* | (2006.01) |
| *H04L 12/851* | (2013.01) |
| *H04M 3/22* | (2006.01) |
| *H04L 12/26* | (2006.01) |

(52) U.S. Cl.
CPC ............. *H04L 63/00* (2013.01); *H04L 63/30* (2013.01); *H04L 63/306* (2013.01); *H04M 3/2281* (2013.01); *H04M 7/006* (2013.01)

(56) References Cited

U.S. PATENT DOCUMENTS

| | | | | |
|---|---|---|---|---|
| 5,455,953 | A * | 10/1995 | Russell | 710/266 |
| 5,553,242 | A * | 9/1996 | Russell et al. | 709/227 |
| 5,617,570 | A * | 4/1997 | Russell et al. | 719/312 |
| 6,131,163 | A * | 10/2000 | Wiegel | 726/12 |
| 6,549,613 | B1 * | 4/2003 | Dikmen | 379/70 |
| 6,654,589 | B1 * | 11/2003 | Haumont | 455/67.11 |
| 6,678,270 | B1 * | 1/2004 | Garfinkel | 370/392 |
| 6,681,258 | B1 * | 1/2004 | Ratcliff et al. | 709/245 |
| 6,684,251 | B1 * | 1/2004 | Qiu et al. | 709/228 |
| 6,721,274 | B2 * | 4/2004 | Hale et al. | 370/235 |
| 6,741,595 | B2 * | 5/2004 | Maher et al. | 370/392 |
| 6,754,834 | B2 * | 6/2004 | Miettinen et al. | 726/3 |
| 7,152,103 | B1 * | 12/2006 | Ryan et al. | 709/224 |
| 7,310,331 | B2 * | 12/2007 | Sjoblom | 370/353 |
| 7,460,484 | B2 * | 12/2008 | Roberts et al. | 370/244 |
| 7,471,683 | B2 * | 12/2008 | Maher et al. | 370/392 |
| 7,529,200 | B2 * | 5/2009 | Schmidt et al. | 370/260 |
| 7,564,854 | B2 * | 7/2009 | Pong | 370/395.52 |
| 7,657,011 | B1 * | 2/2010 | Zielinski et al. | 379/93.02 |
| 7,764,768 | B2 * | 7/2010 | Davis et al. | 379/35 |
| 7,835,722 | B2 * | 11/2010 | Munje et al. | 455/410 |
| 7,839,846 | B2 * | 11/2010 | Ko | 370/389 |
| 7,843,902 | B2 * | 11/2010 | Imbimbo et al. | 370/352 |
| 7,958,233 | B2 * | 6/2011 | Fernandez Gutierrez | 709/224 |
| 7,965,674 | B2 * | 6/2011 | Sengupta et al. | 370/328 |
| 8,041,022 | B1 * | 10/2011 | Andreasen et al. | 379/221.1 |
| 8,090,349 | B2 * | 1/2012 | Munje et al. | 455/410 |
| 8,127,005 | B2 * | 2/2012 | Fernandez Gutierrez | 709/224 |
| 8,160,021 | B2 * | 4/2012 | Ohba et al. | 370/331 |
| 8,179,803 | B2 * | 5/2012 | Parsons | 370/241 |
| 8,189,584 | B2 * | 5/2012 | Fernandez Gutierrez | 370/390 |
| 8,190,739 | B2 * | 5/2012 | Fernandez Gutierrez | 709/224 |
| 8,260,258 | B1 * | 9/2012 | Li et al. | 455/410 |
| 8,265,077 | B2 * | 9/2012 | Imbimbo et al. | 370/392 |
| 8,340,292 | B1 * | 12/2012 | Schnellbacher et al. | 380/250 |
| 8,400,927 | B2 * | 3/2013 | Attanasio et al. | 370/241 |
| 8,548,132 | B1 * | 10/2013 | Zielinski et al. | 379/93.02 |
| 8,570,869 | B2 * | 10/2013 | Ojala et al. | 370/235 |
| 2002/0049913 | A1 * | 4/2002 | Lumme et al. | 713/201 |
| 2002/0141336 | A1 * | 10/2002 | Hale et al. | 370/229 |
| 2002/0143986 | A1 * | 10/2002 | Hale et al. | 709/238 |
| 2002/0150096 | A1 * | 10/2002 | Sjoblom | 370/389 |
| 2002/0156896 | A1 * | 10/2002 | Lin et al. | 709/227 |
| 2003/0018808 | A1 * | 1/2003 | Brouk et al. | 709/238 |
| 2003/0078041 | A1 * | 4/2003 | Dikmen et al. | 455/433 |
| 2003/0101356 | A1 * | 5/2003 | Miettinen et al. | 713/201 |
| 2003/0227917 | A1 * | 12/2003 | Maher et al. | 370/392 |
| 2004/0165709 | A1 * | 8/2004 | Pence et al. | 379/201.01 |
| 2004/0186891 | A1 * | 9/2004 | Panec et al. | 709/206 |
| 2004/0202295 | A1 * | 10/2004 | Shen et al. | 379/112.01 |
| 2004/0205192 | A1 * | 10/2004 | Olson et al. | 709/227 |
| 2004/0215770 | A1 * | 10/2004 | Maher et al. | 709/224 |
| 2005/0073964 | A1 * | 4/2005 | Schmidt et al. | 370/260 |
| 2005/0135428 | A1 * | 6/2005 | Hellgren | 370/481 |
| 2005/0152275 | A1 * | 7/2005 | Laurila et al. | 370/241 |
| 2005/0174937 | A1 * | 8/2005 | Scoggins et al. | 370/230 |
| 2005/0210127 | A1 * | 9/2005 | Pohja et al. | 709/224 |
| 2005/0265353 | A1 * | 12/2005 | Sengupta et al. | 370/395.52 |
| 2006/0050644 | A1 * | 3/2006 | Roberts et al. | 370/244 |
| 2006/0072550 | A1 * | 4/2006 | Davis et al. | 370/352 |
| 2006/0080446 | A1 * | 4/2006 | Bahl | 709/227 |
| 2006/0094354 | A1 * | 5/2006 | Munje et al. | 455/39 |
| 2006/0227754 | A1 * | 10/2006 | Ko | 370/338 |
| 2006/0259928 | A1 * | 11/2006 | Di Serio et al. | 725/62 |
| 2007/0088670 | A1 * | 4/2007 | Laurila | 707/1 |
| 2007/0165655 | A1 * | 7/2007 | Haumont | 370/401 |
| 2007/0183365 | A1 * | 8/2007 | Ohba et al. | 370/331 |
| 2008/0069116 | A1 * | 3/2008 | Pong | 370/395.52 |
| 2008/0276294 | A1 * | 11/2008 | Brady | 726/1 |
| 2009/0154495 | A1 * | 6/2009 | Ojala et al. | 370/469 |
| 2009/0177784 | A1 * | 7/2009 | Olson et al. | 709/228 |
| 2009/0190479 | A1 * | 7/2009 | Parsons | 370/241 |
| 2009/0196301 | A1 * | 8/2009 | Parsons | 370/400 |
| 2009/0207751 | A1 * | 8/2009 | Attanasio et al. | 370/252 |
| 2009/0279432 | A1 * | 11/2009 | Solis et al. | 370/235 |
| 2010/0161790 | A1 * | 6/2010 | Sheppard | 709/224 |
| 2010/0199189 | A1 * | 8/2010 | Ben-Aroya et al. | 715/736 |
| 2010/0235453 | A1 * | 9/2010 | Attanasio et al. | 709/206 |
| 2010/0291906 | A1 * | 11/2010 | DeLuca et al. | 455/414.1 |
| 2011/0058519 | A1 * | 3/2011 | Munje et al. | 370/328 |
| 2011/0145396 | A1 * | 6/2011 | Kim et al. | 709/224 |
| 2011/0191467 | A1 * | 8/2011 | Imbimbo et al. | 709/224 |
| 2012/0096145 | A1 * | 4/2012 | Le et al. | 709/224 |
| 2012/0243549 | A1 * | 9/2012 | Lyons et al. | 370/410 |
| 2013/0041934 | A1 * | 2/2013 | Annamalaisami et al. | 709/203 |
| 2013/0159510 | A1 * | 6/2013 | Cahill | 709/224 |

FOREIGN PATENT DOCUMENTS

| | | |
|---|---|---|
| WO | 0119036 A1 | 3/2001 |
| WO | 2007097667 A1 | 8/2007 |

OTHER PUBLICATIONS

"Lawful Interception (LI); Handover Interface and Service-Specific Details (SSD) for IP delivery; Part 2: Service-specific details for E-mail services"; ETSI TS 102 232-2, ETSI Standards, LIS, Sophia Antipolis, Cedex, France, vol. LI, No. V2.1.1, Dec. 1, 2006, 42 pages, XP014039775.

"Lawful Interception (LI); Retained Data; Requirements of Law Enforcement Agencies for handling Retained Data", ETSI TS 102 656, ETSI Standards, LIS Sophia Antipolis, Cedex, France, No. V1.1.2, Dec. 1, 2007, 17 pages, XP014040515.

* cited by examiner

Fig. 1

PRIOR ART

Fig. 2

PRIOR ART

Fig. 3

PRIOR ART

APPARATUSES, METHODS, AND COMPUTER PROGRAM PRODUCTS FOR DATA RETENTION AND LAWFUL INTERCEPT FOR LAW ENFORCEMENT AGENCIES

CROSS-REFERENCE TO RELATED APPLICATION

This application is a 35 U.S.C. §371 National Phase Entry Application from PCT/EP2008/052143, filed Feb. 21, 2008, and designating the United States.

TECHNICAL FIELD

The present invention relates to methods and arrangements in a telecommunications system comprising Data Retention (DR) sources and/or Intercepting Control Elements (ICEs) for providing data to lawful interception requesting entities. More in detail, the telecommunications systems in which the present invention can be implemented comprise service nodes acting as DR source or ICE for the retention or interception of services data, respectively.

BACKGROUND

In many countries operators and Internet service providers are today obliged by legal requirements to provide stored traffic data generated from public telecommunications and Internet services for the purpose of detection, investigation and prosecution of crime and criminal offences, including terrorism.

There are also a number of initiatives within the European Union (EU) to regulate the legal basis for data retention. The EU Parliament adopted a set of amendments and by that approved the Council's proposed directive on data retention (Directive 2006/24/EC). In this directive, initial requirements and how an extension of the directive will be handled are described. Consequently, an essential part of operator's effort to comply with current legislation is to secure that processes and tools can be adapted to handle an expansion of the scope for data retention.

Technical specification ETSI DTS/LI-00039 gives guidance for the delivery and associated issues of retained data of telecommunications and subscribers. In particular, ETSI DTS/LI-00039 provides a set of requirements relating to Handover Interfaces for the retained traffic data and subscriber data by law enforcement and other authorized requesting authorities. The requirements are to support implementation of Directive 2006/24/EC of the European Parliament and of the Council of 15 Mar. 2006 regarding the retention of data. Technical Specification ETSI DTS/LI-00033 contains handover requirements and a handover specification for the data that is identified in EU Directive 2006/24/EC on retained data.

Figure 1:
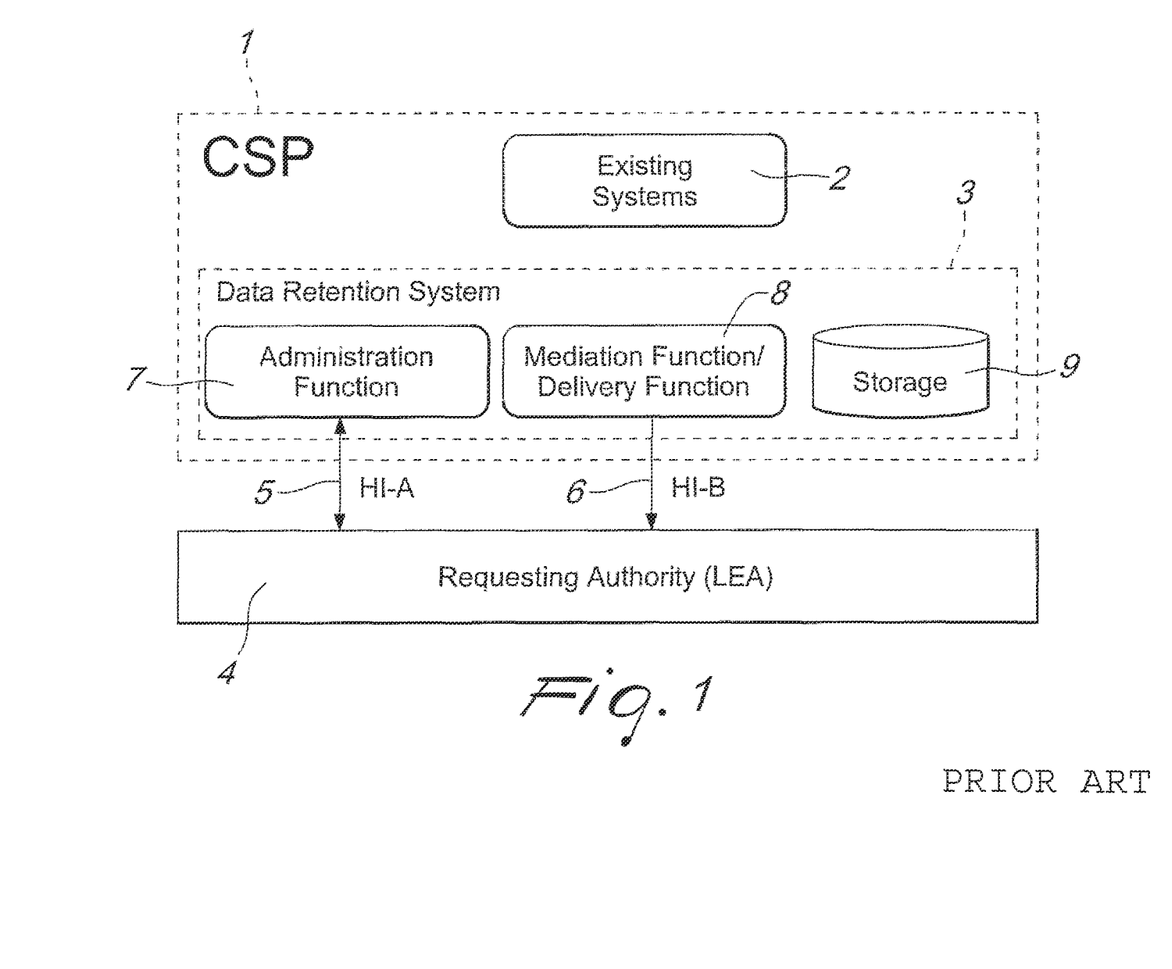
FIG. 1 is a known arrangement of a service provided with Data Retention (DR) capabilities.

FIG. 1 depicts the known arrangement for retaining data in a Communication Service Provider 1 (CSP). Specifically, the CSP 1, which may incorporate existing communication systems 2, is provided with a Data Retention System (DRS) 3 for exchanging retained data relating information with a Requesting Authority 4, which may be a Law Enforcement Agency (LEA).

The data exchanged between the CSP 1 and the Requesting Authority 4 comprises requests from the Requesting Authority 4, corresponding responses from the DRS and other DR information, such as results of the requests and acknowledgements of receipt. The interfaces through which the CSP and DRS exchange the above data with the Requesting Authority are denoted as Handover Interfaces.

The generic Handover Interface adopts a two-port structure in which administrative request/response information and Retained Data Information are logically separated. In particular, a first Handover Interface port HI-A 5 is configured to transport various kinds of administrative, request and response information from/to the Requesting Authority 4 and an organization at the CSP 1 that is responsible for Retained Data matters, identified by an Administration Function 7.

A second Handover Interface HI-B 6 is configured to transport the retained data information stored in a repository 9 from the CSP 1 to the Requesting Authority 4. The individual retained data parameters have to be sent to the Requesting Authority 4 at least once (if available). To this aim, a Mediation/Delivery function 8 is provided, for retrieving the retained data from the memory means 9 and forward such data to the Requesting Authority 4 in a suitable format through the HI-B 6.

Figure 2:
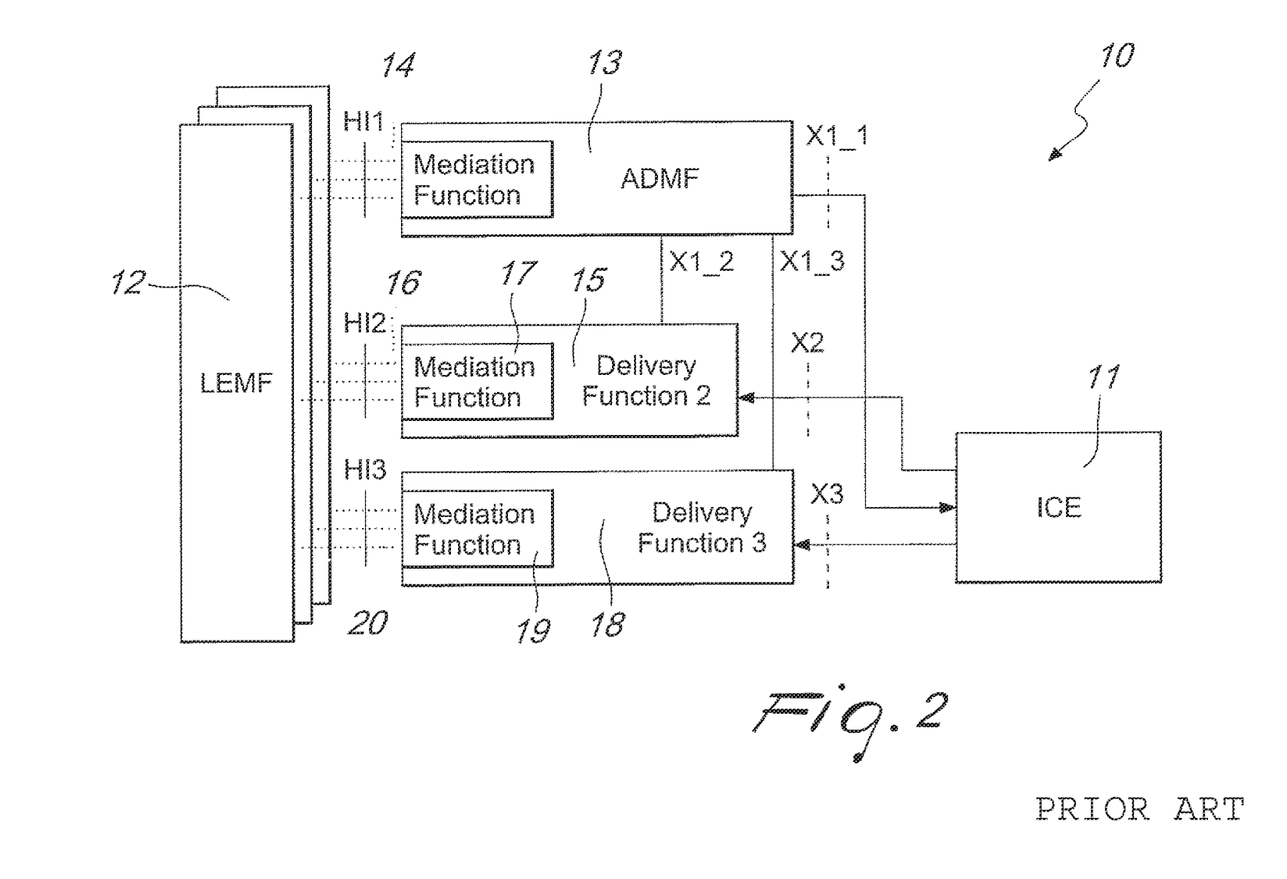
FIG. 2 is a known arrangement of a Lawful Interception system.

A second system for accessing communications related data is the well-known Lawful Interception (LI) system, which is depicted in FIG. 2. The standard architecture 10 comprises an Intercepting Control Element (ICE) 11 providing the user equipment of the target user with an access to the telecommunications network. An ICE may be, for instance, a 3G Mobile service Switching Center (MSC) Server, a 3G Gateway MSC Server, a Serving GPRS Support Node (SGSN), or a Gateway GSN (GGSN).

The architecture 10 further comprises one or more Law Enforcement Monitoring Facilities (LEMFs) 12 through which respective LEAs receive interception information.

An Administration Function (ADMF) entity 13 is further configured for sending the target identity and LI authorization data from the LEAs to the ICE. The ADMF 13 interfaces through a first Handover Interface 14 (HI1) with all the LEAs that may require interception in the intercepting network, keeps the intercept activities of individual LEAs separate and interfaces to the intercepting network. The ADMF 13 is also used to hide from the ICE 11 that there might be multiple activations by different LEAs on the same target. The ADMF 13 may be partitioned to ensure separation of the provisioning data from different agencies.

Every physical ICE 11 is linked to the ADMF by means of its own X1_1 interface. Consequently, every single ICE performs interception, i.e. activation, deactivation, interrogation as well as invocation, independently from other ICEs.

In order to deliver the intercepted information to the LEAs, two Delivery Functions (DF) entities are provided, each exchanging respective portions of information with the ADMF 13 (through X1_2 and X1_3 interfaces) and the LEMF 12.

In particular, a DF2 entity 15 is configured to receive Intercept Related Information (IRI) from the ICE, through an X2 interface, and to convert and distribute the IRI to the relevant LEAs via a second Handover Interface 16 (HI2) by means of a Mediation Function (MF) 17.

The IRI is a collection of information or data associated with telecommunication services involving the target identity, such as call associated information or data (e.g. unsuccessful call attempts), service associated information or data (e.g. service profile management by subscriber) and location information.

A DF3 entity 18, instead, is configured to receive Content of Communications (CC) information from the ICE 11 through an X3 interface, and to convert and distribute such information to the relevant LEA through an MF 19 and a third Handover Interface 20 (HI3).

The CC is information different from the IRI, which is exchanged between two or more users of a telecommunications service and, more in general, includes information which may, as part of some telecommunications service, be stored by one user for subsequent retrieval by another user.

In the most recent developments, current IP networks can be provided with a deep packet inspection feature for improving the operator's existing infrastructure with better service and subscriber awareness.

Figure 3:
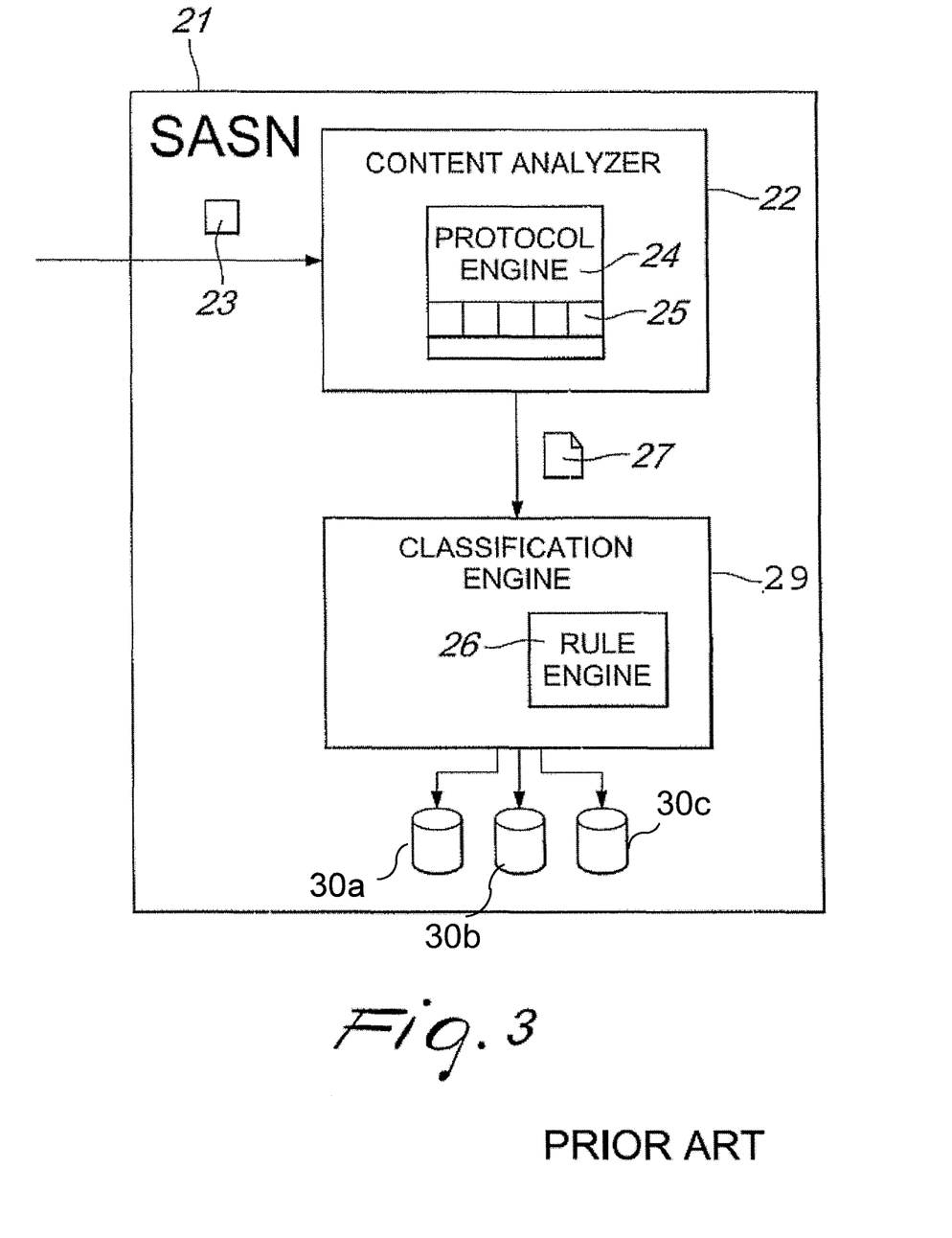
FIG. 3 shows the typical structure of a Service Aware Support Node (SASN) which may be used in the invention.

With reference to FIG. 3, the deep packet inspection function is usually implemented by a Content Analyzer element 22, present in a Service Aware Support Node 21 (SASN). SASNs perform a stateful analysis of the traffic, which enables a richer packet inspection (for example, event detection is based on this feature). When a new protocol flow is detected (for example a TCP connection) an entity is allocated in SASN to store its state and associated parameters. This entity is called an analysis flow. Several flows can exist for the same user session, one for each stateful protocol to be analyzed.

The Content Analyzer 22 is configured to parse the user incoming traffic 23, delimit the flows according to the protocol being used, and extract several parameters that are used by a traffic classification engine 24, according to configurable classification rules.

The result of the deep packet inspection is to classify raw traffic packets into a number of configurable traffic categories or Virtual Classes. Examples of traffic categories are: Web navigation to a certain site, IP traffic, FTP downloads, and so on. A Virtual Session is an entity that represents all the traffic of the same type within a user data session.

The packet analysis is the process whereby a packet is identified as belonging to certain protocols and useful information is extracted from it.

Packet analysis is performed by a Protocol Engine 24 of the Content Analyzer 22. The Protocol Engine 24 is composed of several Protocol Analyzers 25, one for each of the supported protocols. Protocol Analyzers 25 are linked with one another to build a protocol analysis stack.

The collection of parameters obtained by the analysis of one packet is referred to as the Packet Context. The Packet Context contains parameters that have been obtained by several Protocol Analyzers.

The Rule Engine 26 of the Classification Engine 29 is configured to classify the traffic packets 27 once the Protocol Engine 24 has analyzed those packets and their Packet Context has been extracted. Databases 30a, 30b, and 30c are repositories of rules used to analyze the packets.

Figure 4:
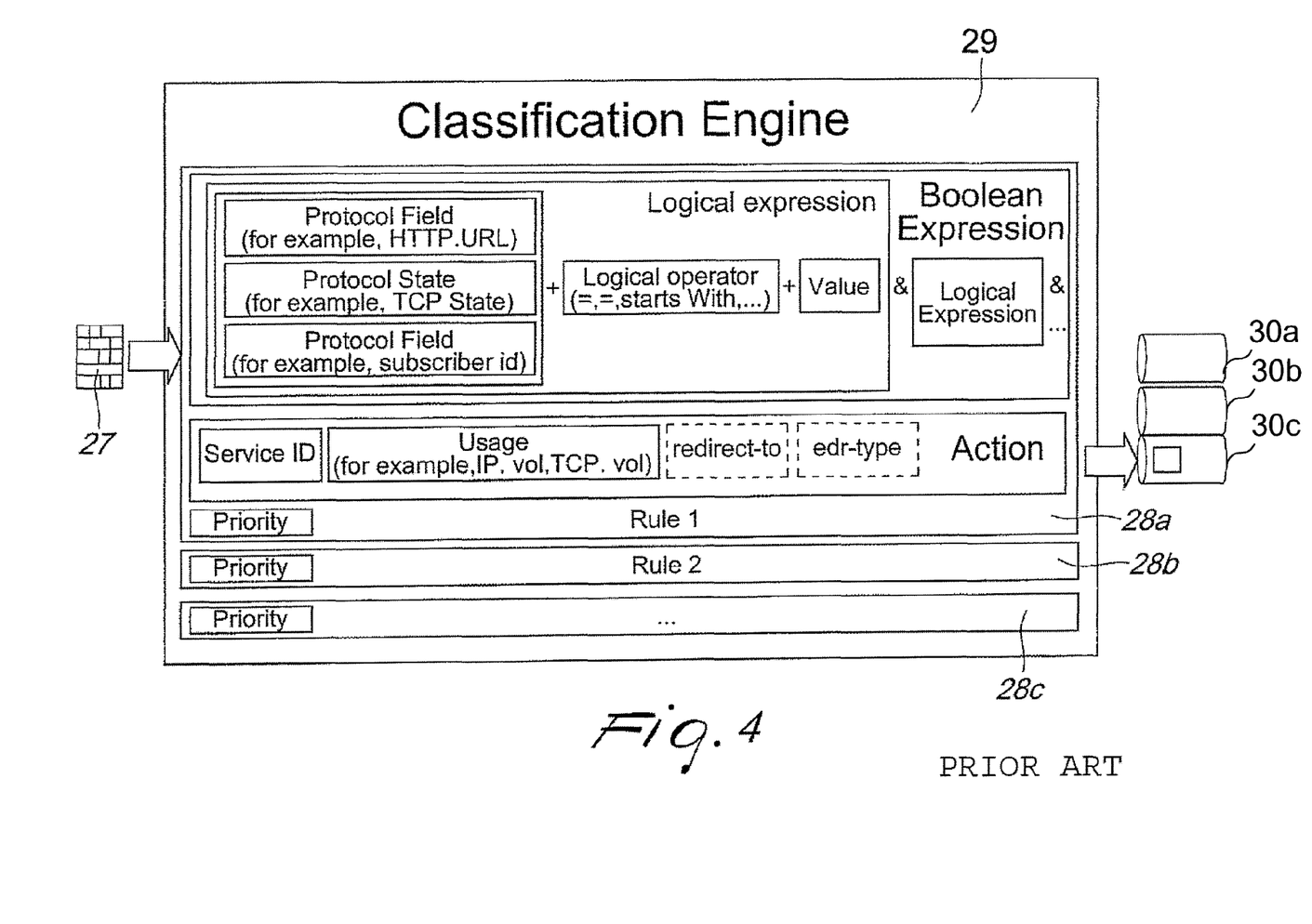
FIG. 4 shows a classification engine of the SASN of FIG. 3.

An example of Classification Engine 29 is shown in FIG. 4. The Classification Rules are configurable combinations of packet context parameters (for example, protocol state and Uniform Resource Identifier) combined by logical operators into a Boolean expression.

The protocol fields and states that are exposed by the different protocol analyzers, can be used to create traffic classification rules 28a, 28b, 28c and can be included in Event Detail Records (EDRs).

An EDR represents the report of the deep packet inspection and contains a first set of fields which are shared by all protocol analyzers and other sets of fields specific for the traffic analyzed by the corresponding protocol analyzer, e.g. HTTP fields and IP fields.

EDRs are usage records generated with information that is totally configurable by the operator, thus achieving a great flexibility, EDR flexibility is provided in two areas: EDR fields and EDR generation rules.

To facilitate integration, EDRs may use industry standards for their format, such as CSV and XML.

When integrating a data retention or lawful interception solution for IP services, there are some data retention sources or Intercepting Control Elements (ICEs) from which it is possible to retrieve information related to communications at different TCP/IP stack layers, by using packet inspection features.

A problem exists at the DR/LI Handover Interfaces with the data/interception requesting authority, because the communications exchanged through the Handover Interfaces relate to different TCP/IP stack layers. For instance, in the known DR systems which can retrieve information related to communications at different TCP/IP stack layers, the requesting LEA receives from the DR system retained data separately for each of the stack layers, e.g. retained data at the application layer (Layer 5), at the transport layer (Layer 4), at the network layer (Layer 3) and at the data link layer (Layer 2).

Similarly, in the known LI systems which can retrieve information related to communications at different TCP/IP stack layers, the LEA/LEMF can separately receive from the LI Mediation Function 2 IRIs containing application layer information, IRIs containing transport layer information, IRIs containing network layer and IRIs containing data link layer information.

In some cases, data from different communications stack layers may be collected from a plurality of different sources and it is not possible to correlate them. For instance, GPRS nodes may provide a private IP address which, through a NAT function, is translated into a public IP address which finally arrives at a Messaging Server. In such case, the IP addresses would not be enough for correlating the communications at different layers.

As a consequence, there is currently no possibility of correlating communications at different stack layers on the Handover Interfaces.

SUMMARY

The aim of the present invention is to provide a method and DR/LI system nodes that overcome the above drawbacks.

This aim and other objects which will become better apparent hereinafter are achieved by a method for providing a Law Enforcement Agency LEA with retention or interception data related to a target user. At a data retention source node or at an interception control element of a telecommunications network, traffic packets involving the target user are inspected and a plurality of usage data records based on the inspected traffic packets are generated. Each record comprises information relating to a certain service class and to a respective communications stack layer. For each communications session involving a plurality of different communications stack layers, at the data retention source node or, respectively, the interception control element, the plurality of usage data records are provided with a same correlation identity number for correlating the data at the different communications stack layers. Then, the usage data records comprising the correlation identity number to the LEA are sent, for instance to the LI system or the data Retention System, respectively.

Preferably, the correlation identity number identifies the lowest communications stack layer of the communications stack layers. The correlation identity number may be a unique Communications Identity Number CIN assigned to the communications session in the lowest communications stack layer. In this case, each usage data record may already comprise a further CIN identifying a respective session in a respective communications stack layer, which accompanies the unique CIN.

The data retention source node and the intercepting control element may be a Service Aware Support Node SASN.

The above aim and objects are also achieved by a data retention source node comprising packet inspection means and means for communicating with a Data Retention system. The packet inspection means are configured to generate a plurality of usage data records based on inspected traffic packets. Each record comprises information relating to a certain service class and to a respective communications stack layer. The packet inspection means are further configured to provide, for each communications session involving a plurality of different communications stack layers, the plurality of usage data records with a same correlation identity number for correlating the data at the different communications stack layers. The data retention source node further comprises means for sending the usage data records comprising the correlation identity number to the Data Retention system.

Moreover, the aim and the objects of the invention are achieved by an Intercepting Control Element (ICE) comprising packet inspection means for providing Intercept Related Information (IRI) and Content of Communication (CC) to a Lawful Interception (LI) system. The packet inspection means are configured to generate a plurality of IRIs based on inspected traffic packets, each IRI comprising information relating to a certain service class and to a respective communications stack layer. The packet inspection means are further configured to provide, for each communications session involving a plurality of different communications stack layers, the plurality of IRIs with a same correlation identity number for correlating the data at the different communications stack layers. The ICE also comprises means for sending the IRIs comprising the correlation identity number to the LI system.

The present invention also concerns computer programs comprising portions of software codes in order to implement the method as described above when operated at a processor of a data retention source node or of an ICE. Such a computer program can be stored on a computer readable medium. The computer-readable medium can be a permanent or rewritable memory within the data retention source node or the ICE or can be located externally. The respective computer program can be also transferred to the data retention source node or to the ICE, for example via a cable or a wireless link as a sequence of signals.

According to a particular aspect of the invention, a computer program is provided, which is loadable into a processor of a data retention source node or of an intercepting control element and which comprises code adapted to a) inspect traffic packets involving the target user;

b) generate a plurality of usage data records based on the inspected traffic packets, wherein each record comprises information relating to a certain service class and to a respective communications stack layer;

c) for each communications session involving a plurality of different communications stack layers, provide the plurality of usage data records with a same correlation identity number for correlating the data at the different communications stack layers;

d) send the usage data records comprising the correlation identity number to a Lawful Enforcement Agency.

The invention advantageously allows to correlate data related to communications at different stack layers, be them TCP/IP layers or OSI layers, in particular to correlate data at different layers by employing existing DR and LI functionalities.

A more efficient and complete scenario related to services, such as Internet services, to be detected for investigation purposes is achieved. In particular, LEAs are provided with more detailed information about the communications of a target user, allowing the LEAs to retrieve traffic data related to IP services, both narrowband and broadband, fixed and mobile, covering any type of existing or future network services.

The invention even makes a location identification mechanism possible on the Handover Interfaces based on the connection in which the target user is involved.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 5:
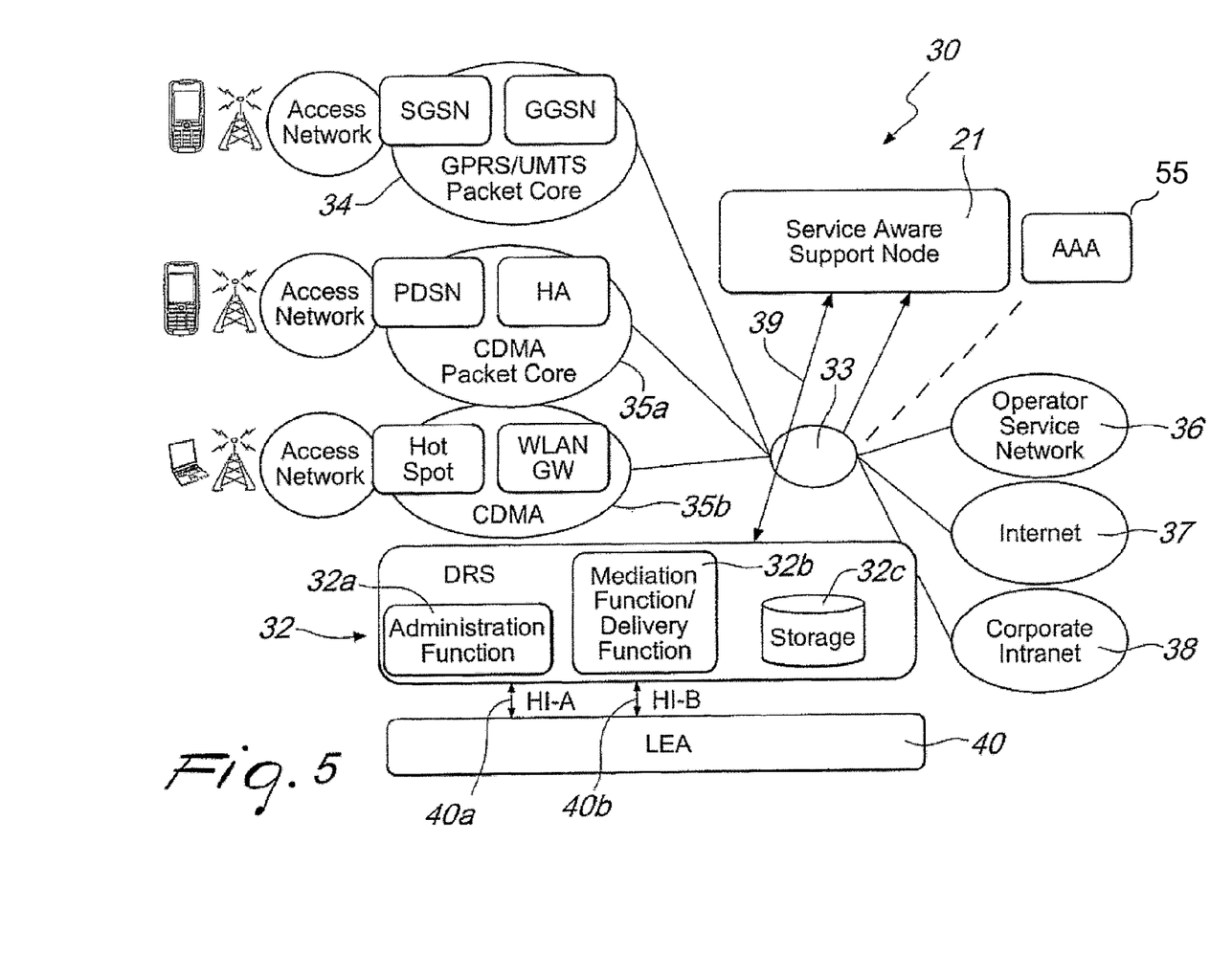
FIG. 5 is a telecommunications system comprising a DR system including a DR source node according to a first embodiment of invention.

With reference to FIG. 5, a telecommunications system 30 incorporating features according to a first embodiment of the invention comprises a Service Aware Support Node (SASN) 21, an automatic Data Retention System DRS 32, a gateway 33 and a plurality of networks connected to the gateway 33. Such networks may comprise a GPRS/UMTS network 34, CDMA networks 35a-35b, an operator service network 36, the Internet 37, a corporate intranet network 38, and/or authentication, authorization, and accounting (AAA) node 55.

The DRS 32 comprises an Administration Function 32a configured to exchange administrative, request and response information with a Law Enforcement Agency (LEA) 40 via the Handover Interface HI-A 40a.

Additionally, the DRS 32 includes a Mediation/Delivery Function 32b configured to retrieve retained data from storage means 32c of the DRS 32 and forward such data in a format according to the invention to the LEA 40, through the Handover Interface HI-B 40b.

The SASN 21 preferably comprises the content analyzer 22, the protocol engines 24-25, the classification engine 24 and the rule engine 26 as discussed above and is further configured in accordance to the invention. The SASN may also comprise further processing/classifying elements.

In general, the SASN 21 is able to filter the content of communication related to specific services, in particular to capture IP traffic packets and to analyze them through deep packet inspection features, in order to provide service awareness.

The SASN 21 can be located in any point of the IP network 30 in the path of the traffic which has to be monitored, e.g. it can be connected to the gateway 33 as in FIG. 5 or may operate as a gateway itself. The user traffic and possible RADIUS traffic are accordingly captured by the SASN 21 from gateway 33. In the alternative, the SASN 21 may be itself defined as default gateway between two intermediate elements on the path of the user data traffic.

With this type of nodes it is possible to retrieve both information as provided by service unaware nodes like GGSN, SGSN, PDSN, or other nodes of networks 34, 35a, 35b, 36, 37 and 38, as well as information as provided by the other service aware nodes.

For instance, the information provided by a GGSN of network 34 regards the access of mobile users (identified by the IMSI and the MSISDN), the cell id and the PDP address.

As another example, the information provided by an Internet Access Service (IAS) via the Internet 37 may be data related to the internet access (e.g. Access_attempt, Access_failed, Session_start, etc.), the username (or other token used for identification), the type of Internet access (e.g. dial up, ADSL, cable modem, LAN access), the assigned IP address, the MAC address of the target CPE for layer 2 access or the target PSTN/ISDN number for dial up.

The SASN 21 is configured to build separate usage data records such as Event Detail Records EDRs for each stack layer and for each service class and send the same to the DRS 32, to which the SASN 21 is bidirectionally connected by a communication channel 39. In particular, the Mediation Function of the DRS 32 is configured to retrieve the usage data records from the SASN 21 (for instance, using the SFTP protocol) and collect the usage data records for further processing.

The SASN 21 is characterized in that it is configured to introduce a unique correlation identity number to report the requesting agency 40 that the data being reported is related to the same user session.

The unique correlation identity is introduced in each usage record for a certain service and for a certain stack layer and is identical for all the usage records of a user session. Preferably, the unique correlation identity is a unique Communications Identity Number (CIN).

As it is known, a CIN is used in the header of messages such as IRIs to correlate the data within a single communications session and for the same stack layer. In the preferred embodiments of the invention, instead, a single CIN is used for correlating the data within a single communications session at more than one stack layer, such as at a plurality or all of the stack layers.

Having regard to the standard ETSI TS 102 232, an identifier of a communications session consists of a Network Identifier (NID), the Communications Identity Number (CIN) and a Delivery Country Code (DCC).

The CIN is used to identify uniquely the communications session. All the results of the interrogation within a single communications session have the same CIN. The CIN allows the data at a certain layer to be accurately associated.

With the SASN defined as data retention source (as in FIG. 5) or as an ICE (as will be described with reference to FIG. 7), each session in one of the layers will be identified by a CIN.

In order to correlate sessions among the various layers together, the SASN introduces an additional CIN. For instance, when delivering the data related to layers 4, 7 and 7+, the additional CIN is chosen equal to the CIN delivered with the layer 3.

Preferably, the SASN is configured to deliver the CIN identifying a low layer session as additional CIN when delivering higher level layer sessions. In this way, it is possible to report the LEA the information that the higher level sessions related data are obtained from the inspection of the lower layer session.

With reference to a DR system, the unique CIN is delivered via the usage data records and may be the CIN identifying the lowest layer session when delivering the higher level layer sessions.

The Handover Interface HI-B is configured to use the unique CIN to correlate the information of different stack layers collected at the DRS storage. In particular, different flows are correlated and delivered to the LEA 40 by the Mediation/Delivery function 32b.

Figure 6:
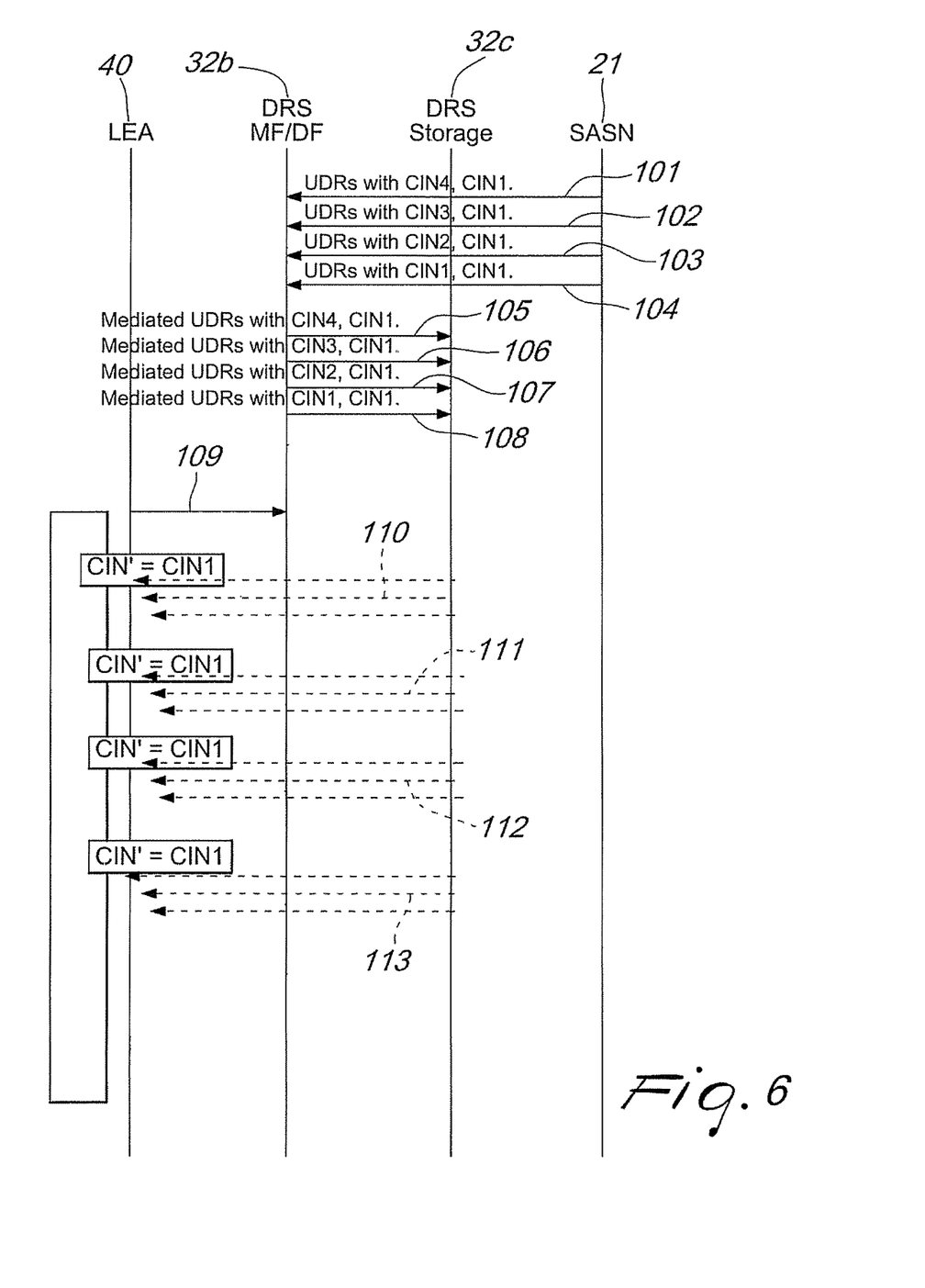
FIG. 6 is a flow diagram of the operation of the system of FIG. 5.

The telecommunications system 30 may operate as follows. With reference to FIG. 6, the SASN 21, acting as Data Retention Source, generates usage data records relating to a certain user session and to a certain stack layer. Each usage data record comprises specific information related to IP services for each protocol stack layer, the CIN used to correlate the data for the same layer and the unique CIN included to correlate the information of different stack layers, according to the invention. Preferably, the additional CIN identifies a low layer of the stack, such as the data-link layer.

In step 101, the SASN 21 transfers to the Mediation Function 32b the usage data records with the application layer information for the IP services and with the application layer CIN (CIN4) and the unique CIN (CIN1).

Similarly, in step 102 the SASN 21 transfers the usage data records with the transport layer information for the IP services and with the transport layer CIN (CIN3) and the unique CIN (CIN1).

Again, in steps 103 and 104 the SASN 21 transfers the usage data records respectively with the network and the data link layer information, the records comprising the unique CIN CIN1. The records with the network layer information carry the network layer CIN (CIN2), while the records with the data link layer information carry the data link CIN (CIN1), which is also identically present in all of the usage data records transmitted in steps 101-104.

The above usage data records are transferred from the SASN 21 to the Mediation Function 32 using, for instance, the SFTP protocol.

In steps 105-108 the mediated usage records generated by the Mediation function 32b based on the received usage data records and comprising the additional unique CIN are stored in the DRS repository 32c.

In step 109, the LEA 40 uses the HI-A interface to hand over the requests for IP Services Retained Data (such as FTP downloads, Web based downloads, or streaming) related to a user.

In response to the request, in steps 110-113 the DRS 32 delivers to the LEA 40, via the HI-B interface, the requested retained data at the application transport, network and data link layers, respectively, correlating the information at higher layers with the information at lower layers via the CIN1.

Figure 7:
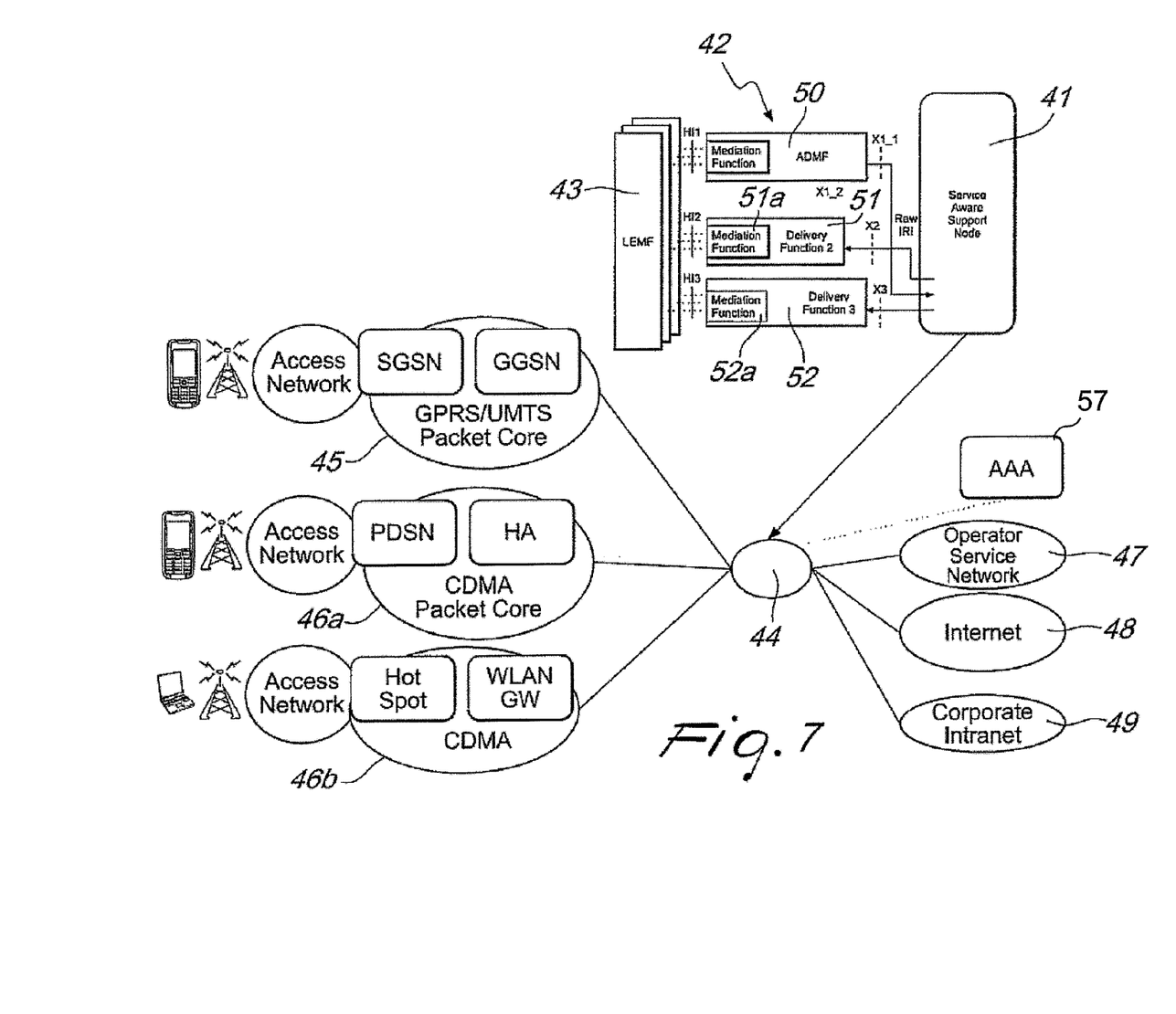
FIG. 7 is a telecommunications system comprising an LI system including an ICE according to a second embodiment of the invention.

With reference to FIG. 7, a telecommunications system incorporating features according to a second embodiment of the invention comprises a Service Aware Support Node (SASN) 41, a Lawful Interception System LI 42, a gateway 44 and a plurality of networks connected to the gateway 44. Such networks may comprise a GPRS/UMTS network 45, CDMA networks 46a-46b, an operator service network 47, the Internet 48, a corporate intranet network 49, and/or authentication, authorization, and accounting (AAA) node 57.

The LI 42 comprises an Administration Function 50 configured to exchange administrative, request and response information with a Law Enforcement Monitoring Function (LEMF) 43 via the Handover Interface H11.

Additionally, the LI 42 includes a Delivery Function 2 51 configured to receive Intercept Related Information (IRI) from the SASN 41 acting as an ICE, through an X2 interface, and to convert and distribute the IRI to the LEMF 43 via a second Handover Interface H12 by means of a Mediation Function (MF) 51a.

The LI 42 further comprises a Delivery Function 3 52, which is configured to receive Content of Communications (CC) information from the SASN 41 through an X3 interface, and to convert and distribute such information to the LEMF 43 through a Mediation Function 52a and a third Handover Interface HI3.

The SASN preferably comprises the content analyzer, the protocol engines, the classification engine and the rule engine as discussed above in relation to FIG. 3 and is further configured in accordance to the invention. The SASN may also comprise further processing/classifying elements.

The SASN 41 can be located in any point of the IP network. For instance, the SASN is connected to a gateway 44 as in FIG. 7. The user traffic and possible RADIUS traffic are accordingly captured by the SASN 41 from gateway 44.

The SASN 41 is configured to build separate IRIs for each service class and send the same to the LI 42 via the X2 interface. The IRIs comprise a unique correlation identity for reporting the LEMF 43 that the data being reported is related to the same user session.

Figure 8:
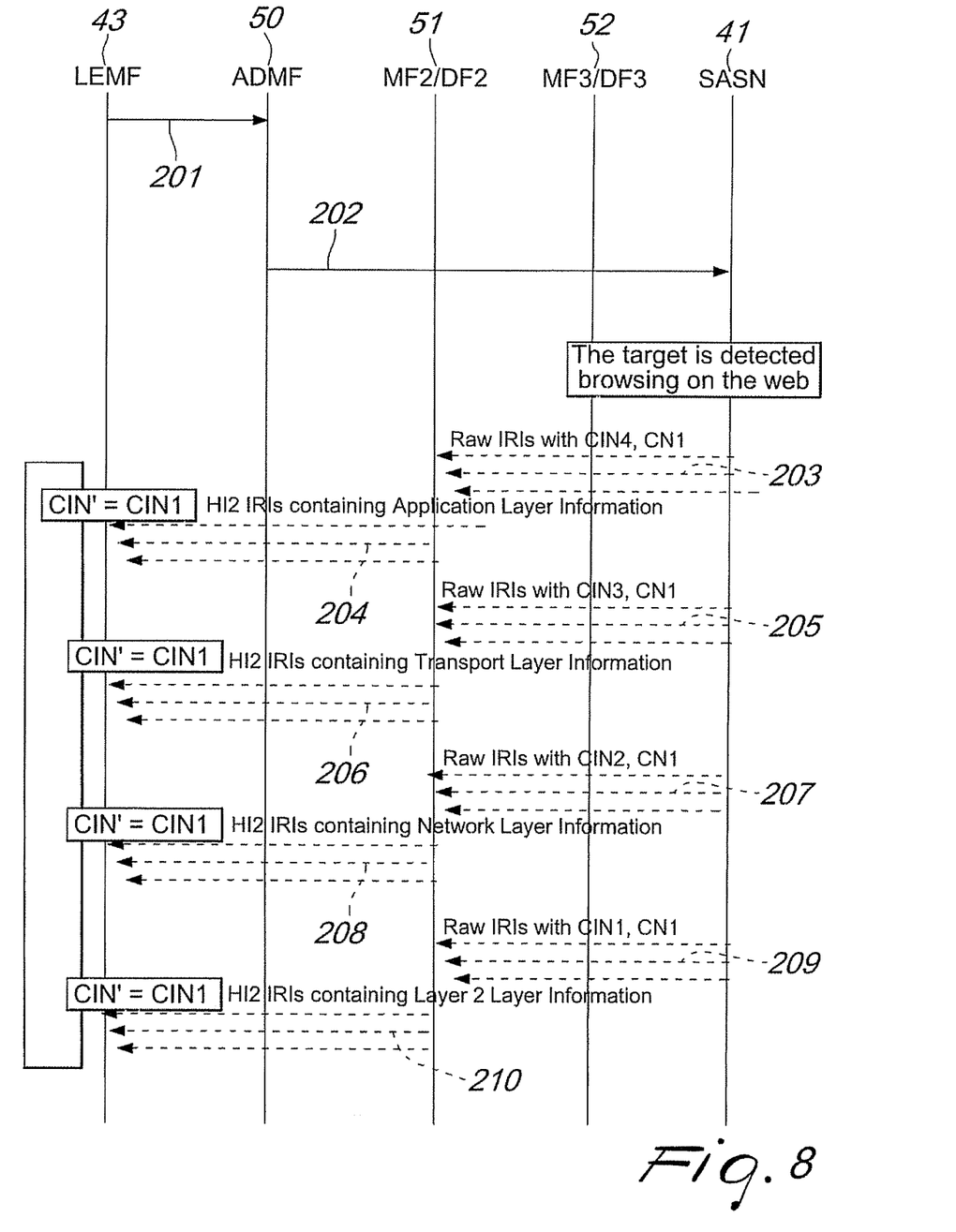
FIG. 8 is a flow diagram of the operation of the system of FIG. 7.

The LI system of FIG. 7 may operate as shown in FIG. 8. In step 201, the LEMF identifies a target subscriber whose traffic needs to be intercepted, based on the usage of specific services, such as FTP downloads, HTTP Web Browsing, Internet access.

In step 202 the ADMF 50 requests the SASN 41 for the activation of a service aware interception related to the specified target.

The target is accordingly detected when using a certain service, e.g. while surfing the web. The SASN 41 then uses its deep packet inspection capabilities to generate separate IRIs for each service class. In particular, the SASN 41 intercepts and filters only relevant traffic, based on the specific services, and forwards IRIs to the MF2/DF2 51. In addition to the existing CIN (CIN1, CIN2, CIN3, CIN3) used to correlate the data for the same layer, an additional CIN (CIN1) is included to correlate the information at different stack layers.

For instance, in step 203 the SASN 41 provides the MF2/DF2 with raw IRIs containing application layer information, the CIN4 and the unique CIN, which is chosen to be the CIN relating to a low stack layer (CIN1), such as Layer 2.

In step 204 the MF2/DF2 51 converts the intercepted traffic into the required standard format and sends it to a collection function running at the LEMF 43 via the HI2.

Similarly, in step 205 the SASN 41 sends the MF2/DF2 raw IRIs containing transport layer information, the CIN3 and the unique identifier CIN1. Such IRIs, after suitable conversion, are forwarded to the LEMF 43 in step 206.

In step 207 the SASN 41 sends the MF2/DF2 raw IRIs containing network layer information, the CIN2 and the unique identifier CIN1. Then, in step 208, the MF/DF2 converts such IRIs and forwards them to the LEMF 43.

Finally, in step 209 the SASN 41 sends the MF2/DF2 raw IRIs containing Layer 2 information, the CIN1 and the unique identifier CIN1. The MF2/DF2 will convert the received intercept information into the suitable format and send it to the LEMF in step 210.

The LEMF will finally correlate the received IRIs with the received CCs among the various stack layers by using the unique CIN (CIN1) as a correlation number.

Figure 9:
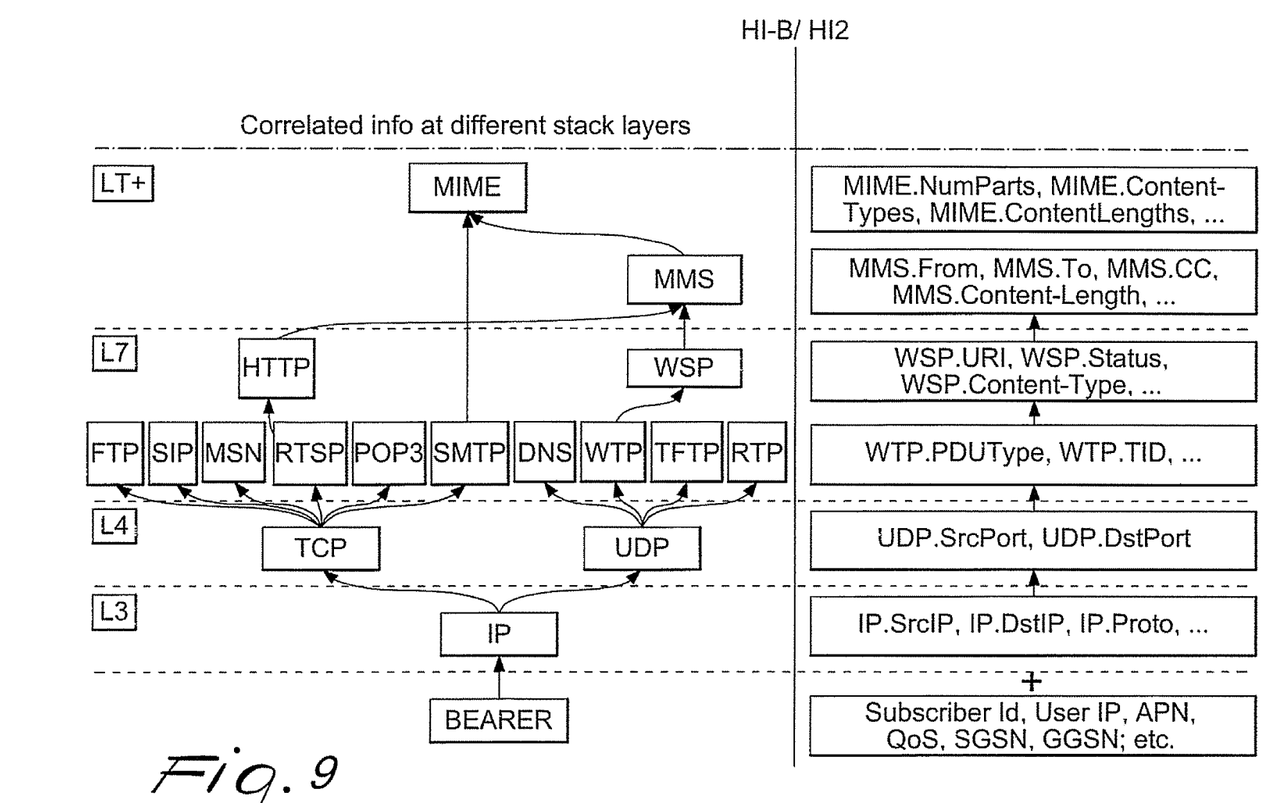
FIG. 9 shows the level structure of a communications stack layer.

In FIG. 9 an example is shown about correlated information at different layers presented to a LEA. As it is noted, starting from the bearer it is possible to go up to the network layer up to the application layer presenting to the LEA a complete stack related to each user session.

The skilled in the art easily understands that the steps described in relation to FIGS. 6 and 8 may be performed by any hardware and/or software and telecommunications means programmed through conventional techniques in order to take into account the additional information and operational data needed by the present invention. The invention is therefore preferably implemented by introducing new functionality in existing systems, through conventional techniques which are clearly in the reach of the average technician and, therefore, are not hereby discussed in detail.

It is noted that the correlation mechanism according to the invention allows to introduce location identification functionalities in data retention or lawful interception systems, as it provides the source/destination IP address linked to the service to be retained or intercepted.

As it is known, the location information is related to the IP address and the layer 2 access information (e.g. MAC address). An IP address and the layer 2 access information can be used not only to identify a connected device but also to describe the "location" of the device.

For instance, considering IPv6 addresses, it is possible to divide a 128-bit address into two parts, a 64 bit routing segment and a 64-bit identity segment, which allows each device wired/wireless to have a unique IP address independent of its current point of attachment to the Internet, More particularly, IPv6 addresses have a network prefix that describes the location of an IPv6-capable device in a network and an interface ID that provides a unique identification number for the device. The network prefix can change based on the user's location in a network, while the interface ID can remain static. The static interface ID allows a device with a unique address to maintain a consistent identity while its location in a network can change.

As another example, in IPv4, the approach to mobility is to use two IP addresses to fully describe a mobile device. The mobile device uses a constant IP address, representing the device's identity.

Such identity IP address is passed to the local mobile base station, which then informs the mobile device's home station of the mobile device's identity address, as well as the address of the current mobile base.

Once a packet reaches the home base station the packet is encapsulated in an IP transport header, with the new destination IP address (of the most recent mobile base station). At the mobile base station the outer IP transport header is stripped off and the original packet is directly passed to the mobile device.

In the invention, by using the correlated information, the law enforcement agencies will be able to receive details related to the IP services used, linked to identification and location information which will be always provided through the unique CIN as correlation identity. In fact, through the unique CIN, the LEA will be always able to correlate the received information, e.g., at the application layer, with the IP address provided in the network layer information. From such IP address the LEA will finally retrieve the location of the target through conventional means.

It has been shown that the invention fully achieves the intended aim and objects, since it provides a data retention or lawful interception requesting agency with information adapted to correlate data at different stack layers, which data is usually separately transmitted from a data retention source or an ICE to the requesting agency.

The data may be even collected from different sources and could nevertheless be correlated to one another at the various stack layers.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method performed in a network node for providing a Law Enforcement Agency LEA with retention or interception data related to a target user over a telecommunications network, the method comprising steps of:
   the network node inspecting traffic packets transmitted over the telecommunications network involving the target user;
   the network node generating a plurality of usage data records based on the inspected traffic packets, each record comprising information relating to a certain service class and to a respective communications stack layer;
   for each communications session involving a plurality of different communications stack layers, the network node providing said plurality of usage data records with a same correlation identity number for correlating the data at said different communications stack layers;
   the network node sending, over the telecommunications network to the LEA, a usage data record for each communication stack layer included in the plurality of different communications stack layers, each usage data record comprising the correlation identity number,
   wherein the correlation identity number is a unique Communications Identity Number (CIN) identifying the lowest communications stack layer of said plurality of different communications stack layers,
   wherein each usage data record comprises a session CIN identifying a respective session in a respective communications stack layer, and
   wherein the usage data records sent from the network node to the LEA include:
      at least one usage data record comprising application layer information, the unique CIN and the session CIN used to correlate the data for the application layer,
      at least one usage data record comprising transport layer information, the unique CIN and the session CIN used to correlate the data for the transport layer,
      at least one usage data record comprising network layer information for IP services, the unique CIN and the session CIN used to correlate the data for the network layer, and
      at least one usage data record comprising data link layer information, the unique CIN and the session CIN used to correlate the data for the data link layer.

2. The method of claim 1, wherein the session CIN is assigned to the respective communications session in the lowest communications stack layer.

3. The method of claim 2, wherein the network node is a data retention source node, wherein said telecommunications network comprises a Data Retention system connected to said LEA and to said data retention source node and comprising a Mediation Function, a Delivery Function and a storage, and wherein said sending step further includes transferring the usage data records from the data retention source node to the Mediation and Delivery Functions, wherein each of the layer information included in the usage data records is for IP services, and
   said usage data records being mediated by said Mediation Function after having been received from the data retention source node and being transferred from the Mediation and Delivery Functions to the storage.

4. The method of claim 3, further comprising the step of sending, by the LEA to the Data Retention system, a request for IP services retained data related to the target user, retrieving the said mediated usage data records from said storage and correlating said usage data records by means of said unique CIN.

5. The method of claim 2, wherein said network node is an interception node, wherein said telecommunications network comprises a Lawful Interception system connected to said LEA and to said interception node and comprising a Mediation Function and a Delivery Function, wherein said usage data records are Intercept Related Information IRI and wherein said sending step further includes transferring the IRI from the interception node to the Mediation and Delivery Functions, wherein the information in the IRI for the data link layer is for IP services, and
   each one of said IRIs being mediated by said Mediation Function after having been received from the interception node and being transferred from the Mediation and Delivery Function to the LEA.

6. The method of claim 1, wherein said network node is a Service Aware Support Node SASN.

7. A data retention source node in communication with a Data Retention system comprising:
   a memory; and
   a processor, wherein said processor is configured to:
      generate a plurality of usage data records based on inspected traffic packets transmitted over a telecommunications network, each record comprising information relating to a certain service class and to a respective communications stack layer,
      for each communications session involving a plurality of different communications stack layers, provide said plurality of usage data records with a same correlation identity number for correlating the data at said different communications stack layers, and
      send, over the telecommunications network to the Data Retention system, a usage data record for each communication stack layer included in the plurality of different communications stack layers, each usage data record comprising the correlation identity number, wherein the correlation identity number is a unique Communications Identity Number (CIN) identifying the lowest communications stack layer of said plurality of different communications stack layers, wherein each usage data record comprises a session CIN identifying a respective session in a respective communications stack layer, and wherein the usage data records sent from the data retention source node to the Data Retention System include:
- at least one usage data record comprising application layer information, the unique CIN and the session CIN used to correlate the data for the application layer,
- at least one usage data record comprising transport layer information, the unique CIN and the session CIN used to correlate the data for the transport layer,
- at least one usage data record comprising network layer information for IP services, the unique CIN and the session CIN used to correlate the data for the network layer, and
- at least one usage data record comprising data link layer information, the unique CIN and the session CIN used to correlate the data for the data link layer.

8. The data retention source node of claim 7, wherein the session CIN is assigned to the communications session in the lowest communications stack layer.

9. A telecommunications network having data retention functionalities, the telecommunications network comprising a data retention source node according to claim 8, a Law Enforcement Agency LEA and a Data Retention system connected to said LEA and to said data retention source node, said Data Retention system comprising a Mediation Function, a Delivery Function and a storage, wherein said processor configured to send said usage data records is further configured to transfer the usage records from the data retention source node to the Mediation and Delivery Functions, wherein each of the layer information included in the usage data records is for IP services, and
said Mediation Function being configured to receive from the data retention source node said usage data records and to mediate said received usage data records, and said Delivery Function being configured to transfer said mediated usage data records to the storage, said Delivery Function being further configured to transfer said mediated usage data records from said storage to said LEA via a Handover Interface HI-B.

10. The telecommunications network of claim 9, wherein the Data Retention system is configured to receive from the LEA via a Handover Interface HI-A a request for IP services retained data related to the target user, to retrieve said mediated usage data records from said storage and to correlate said usage data records by means of said unique CIN.

11. The data retention source node of claim 7, wherein said data retention source node is a Service Aware Support Node SASN.

12. An Intercepting Control Element ICE in communication with a Data Retention System comprising:
a memory; and
a processor, wherein said processor is configured to:
provide Intercept Related Information IRI and Content of Communication CC to a Lawful Interception LI system,
generate a plurality of IRIs based on inspected traffic packets transmitted over a telecommunication network, each IRI comprising information relating to a certain service class and to a respective communications stack layer,
for each communications session involving a plurality of different communications stack layers, provide said plurality of IRIs with a same correlation identity number for correlating the data at said different communications stack layers, and
send said IRIs, over the telecommunications network to the LI system, an IRI for each communication stack layer included in the plurality of different communications stack layers, each IRI comprising the correlation identity number,
wherein the correlation identity number is a unique Communications Identity Number (CIN) identifying the lowest communications stack layer of said plurality of different communications stack layers,
wherein each IRI comprises a session CIN identifying a respective session in a respective communications stack layer, and
wherein each IRI's sent from the ICE to the LI system include
- at least one IRI comprising application layer information, the unique CIN and the CIN used to correlate the data for the application layer,
- at least one IRI comprising transport layer information, the unique CIN and the CIN used to correlate the data for the transport layer,
- at least one IRI comprising network layer information, the unique CIN and the CIN used to correlate the data for the network layer, and
- at least one IRI comprising Layer 2 information for IP services, the unique CIN and the CIN used to correlate the data for the Layer 2 layer.

13. The ICE of claim 12, wherein the session CIN is assigned to the communications session in the lowest communications stack layer.

14. The ICE of claim 12, wherein said ICE is a Service Aware Support Node SASN.

15. A non-transitory computer readable medium having instructions stored therein, which when executed by a processor of a network node, causes the processor to execute a computer program that includes code adapted to
a) inspect traffic packets transmitted over the telecommunication network involving the target user;
b) generate a plurality of usage data records based on the inspected traffic packets, each record comprising information relating to a certain service class and to a respective communications stack layer;
c) for each communications session involving a plurality of different Communications stack layers, provide said plurality of usage data records with a same correlation identity number for correlating the data at said different communications stack layers;
d) send, over the telecommunications network to a Law Enforcement Agency LEA, a usage data record for each communication stack layer included in the plurality of different communications stack layers, each usage data record comprising the correlation identity number,
wherein the correlation identity number is a unique Communications Identity Number (CIN) identifying the lowest communications stack layer of said plurality of different communications stack layers,
wherein each usage data record comprises a Communications Identity Number CIN identifying a respective session in a respective communications stack layer, and wherein the usage data records sent from the network node to the LEA include:
- at least one usage data record comprising application layer information, the unique CIN and the session CIN used to correlate the data for the application layer,
- at least one usage data record comprising transport layer information, the unique CIN and the session CIN used to correlate the data for the transport layer,
- at least one usage data record comprising network layer information for IP services, the unique CIN and the session CIN used to correlate the data for the network layer, and
- at least one usage data record comprising data link layer information, the unique CIN and the session CIN used to correlate the data for the data link layer.

16. A telecommunications network having lawful interception functionalities, the telecommunications network comprising an Intercepting Control Element according to claim 12, a Law Enforcement Agency LEA and a Lawful Interception LI system connected to said LEA and to said ICE, said LI system comprising at least one Mediation Function 2 and a Delivery Function 2, wherein said processor configured to send said transfer said IRIs is further configured to transfer from the ICE to the Mediation and Delivery Functions 2, and
- said Mediation Function 2 being configured to mediate each one of said IRIs after they have been received from the ICE and to transfer said IRIs to the LEA via a Handover Interface HI2.

* * * * *